A. W. LARSON.
LEATHER CUTTING TOOL.
APPLICATION FILED SEPT. 29, 1914.

1,134,542.

Patented Apr. 6, 1915.

UNITED STATES PATENT OFFICE.

AMOS W. LARSON, OF ROCKFORD, ILLINOIS.

LEATHER-CUTTING TOOL.

1,134,542.  Specification of Letters Patent.  Patented Apr. 6, 1915.

Application filed September 29, 1914. Serial No. 864,128.

*To all whom it may concern:*

Be it known that I, AMOS W. LARSON, a citizen of the United States, residing at Rockford, in the county of Winnebago and State of Illinois, have invented certain new and useful Improvements in Leather-Cutting Tools, of which the following is a specification.

This invention relates to cutting-tools and to those adapted for cutting leather or other material of similar quality and considerable body thickness and rigidity as contrasted with tools for cutting relatively thin fabrics, oil-cloth, ordinary paper, etc.

More particularly, a tool embodying my invention is adapted for cutting belts such as are used on drive pulleys in connection with machinery.

One of the primary objects of my invention is to provide a cutting-tool of simple design for cutting belts crosswise, easily and accurately, in order that the ends of the belts may be accurately joined to fit the belt to the pulleys over which it is to run.

I also aim to provide a cutting tool of this character which shall be easy to handle and operate and shall consist of but few parts, and which may be manufactured at a low cost.

Another object of my invention is to provide in a cutting tool in which an edge of the material to be cut rests against a side-guide, a cutter movable transversely of the side-guide and toward the same to cut the material cross-wise, and wherein the cutter may be adjusted to cut in a path parallel with the side-guide.

Another object of my invention is to provide a combination cutting-tool wherein the cutter is slidable upon the tool to cut cross-wise of the material and may be held fixedly on the tool whereby the tool may be operated as a cutting-gage to cut lengthwise of the tool.

Figure 1:
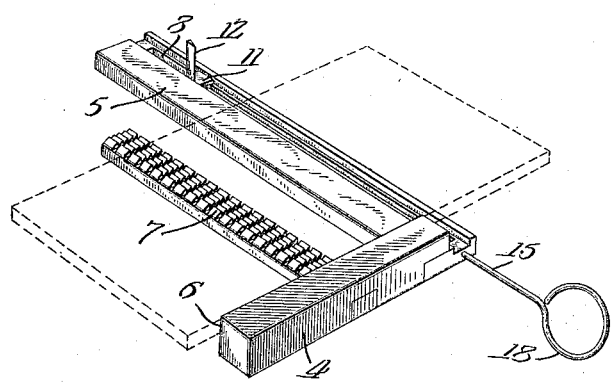
Figure 2:
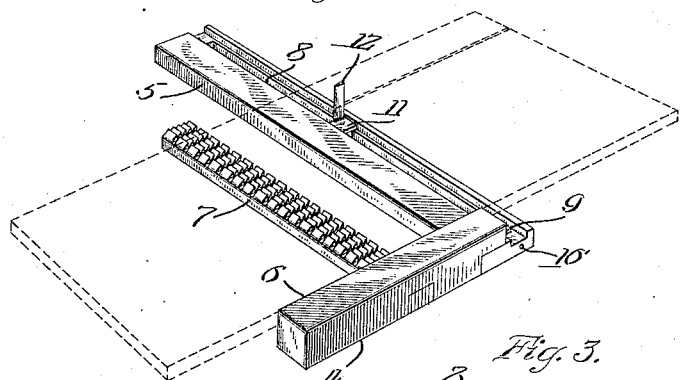
Figure 3:
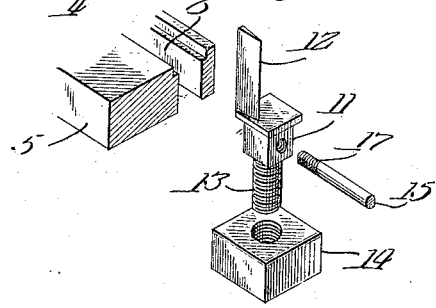

Referring to the drawings: Figure 1 is a view in perspective of my improved cutting-tool showing the cutter as it is used when cutting cross-wise of the material. Fig. 2 is a view in perspective similar to Fig. 1, but with the cutter adjusted to a position whereby the tool may be used as a cutting-gage; and Fig. 3 is a view in perspective of the cutter-block and its connected parts in disassembled position.

It will be seen from an inspection of Fig. 1 that the body of the cutting-tool very closely resembles an ordinary try-square, the arm members of the body being designated by the reference characters 4 and 5. The member 5 is adapted to receive on its top face the flat side of a belt or other material, and the member 4 is provided with a side-guide face 6 arranged at right angles to the member 5 and extending above the top face thereof, whereby an edge of the belt lying on the member 5 may rest against the side-guide 6 and be properly positioned with respect to said member 5. The belt or other material also rests on a face 7 provided with teeth inclined toward the member 5. By holding the tool in the left hand with the thumb on top and bearing down upon the belt to hold the same firmly in connection with the toothed face, the belt will be securely held in position on the tool, and the other hand of the operative may be used to operate the cutting means which will now be described.

The member 5 is provided with a slot 8 formed T-shaped in cross section and extending length-wise of said member at right angles to the side-guide 6 and beyond the side-guide as at 9. The slot 8 serves as a guideway in which is slidably mounted a T-shaped cutter-block 11 which is square in horizontal cross-section. The cutter-block carries an upstanding cutting blade 12 arranged to cut in a path parallel with one of the sides of the block. As the block is arranged in Fig. 1 the blade is facing the side-guide 6 so that when moving toward the said guide the blade will cut in a path at right angles thereto. The cutter-block carries a depending screw 13 upon which a nut 14 is screwed to hold the cutter-block operatively in the guideway and also to lock the cutter-block fixedly in connection with the guideway for a purpose as will afterward appear. A rod 15 extending through an aperture 16 in the member 5 at one end of the slot 8 is screw-threaded at its end 17 in connection with the cutter-block 11, and is formed at its outer end with a handle 18.

It is obvious that with a strip of belting placed upon the tool and the tool held in one hand by the operative as above described, the handle 18 may be grasped by the other hand and drawn forwardly, thereby drawing the cutting blade through the leather belting cutting the same cross-wise at right angles to its edge which engages the side-guide 6. Such a cut is also made when trimming the butt-edge of the belt and a relatively thin body of material may be cut from the belt very accurately and quickly.

To use the tool as a cutting-gage the rod 15 would be unscrewed from the block 11 and detached from the tool, as also would the nut 14. The cutter-block could then be withdrawn from the slot 8, turned a quarter-turn to position the blade parallel with the side-guide 6 as shown in Fig. 2, and be replaced in the slot at any desirable distance from the side-guide and locked fixedly in such position by screwing the nut 14 tightly against the underside of the member 5. The member 4 of the tool may then be grasped by one hand and with a belt or other material resting upon the members 5 and 7 and against the side-guide 6, the tool may be moved lengthwise of the material to cut in a path parallel with the guiding edge thereof. It will be observed that since the teeth on the member 7 are inclined toward the member 5 they will not interfere with the material when the cutter is moved in the direction opposite to that of the inclination of the teeth.

While I have shown and described a particular embodiment of the invention, I do not desire to limit myself to the particular embodiment shown, since various changes in the structural details may be resorted to without departing from the spirit of the invention or sacrificing any of its material advantages.

I claim:

1. In a cutting-tool of the character described, the combination of a body provided with a side-guide and having a T-shaped slot extending transversely thereto, a block having a square portion and an enlarged head extending beyond the sides of said square portion, the block being slidably fitted in the slot whereby the block may be moved lengthwise of the slot, the block having an upstanding cutting-blade fixedly attached thereto, facing toward the said side-guide and arranged in a plane parallel with one of the sides of the block, whereby upon sliding the block in the slot toward the side-guide the blade will cut in a plane transverse to said side-guide, and means for holding the block slidably operative in the slot and for permitting the block to be removed from the slot and replaced therein with its cutting-blade faced parallel with the side-guide.

2. A cutting tool comprising a body having a guide against which the edge of material to be cut abuts, a slot in the body extending transversely to said guide and being T-shaped cross-sectionally, a T-shaped cutter block mounted to slide in the slot toward and away from said guide, the cutter block being provided with an integral upstanding cutting-blade arranged in a plane parallel with the slot, whereby to cut in a plane transversely to said guide, a screw-member disposed beneath the slot overreaching the edges thereof and being in threaded connection with the cutter block whereby to hold the same operatively mounted in the slot, and means for reciprocating said cutter block in the slot, the cutter block being removable from the slot, by removing said screw-member.

3. In a cutting-tool of the character described, a body having a slot T-shaped cross-sectionally, a cutter block mounted to slide in said slot, said cutter block being T-shaped longitudinally and square transversely and being provided with an upstanding cutting-blade integral therewith and arranged in a plane parallel with one of the slideway sides of the cutter-block, and a screw-member disposed below the slot extending beyond the edges thereof and being screw-threaded in connection with the cutter block, whereby the same is held slidably operative in the slot and whereby removal of the screw-member will permit the cutter block to be removed from the slot and replaced therein with its cutting-blade disposed in a plane at right angles to the slot, the screw member adapted to be reconnected with the cutter block to lock the same in a fixed position at any one of various points along the slot.

4. In a cutting-tool, the combination of a body having a surface upon which material to be cut rests on a flat side, the body having a side-guide against which the edge of the body abuts, an elongated slot in said material open at said surface and extending at right angles to said side-guide, a block slidably mounted in said slot below said surface to move in the slot toward and away from said side-guide, a cutting-blade fixedly connected to the block, extending above said surface and being faced toward the side-guide whereby to cut said material at right angles to the said guide when the block is moved toward the same, the cutting-blade being adjustable with respect to the side-guide by removal of the block from the slot and replacing the block so that the blade will be positioned to face parallel with said side-guide, a rod disposed longitudinally in the slot, being detachably connected with the block when the same is in its first mentioned position and being extended beyond the body at the side-guide portion thereof and provided at its extended end with a handle, whereby the cutting block may be drawn toward the side-guide to effect said right angle cut, and means for permitting the block to be removed from the slot after said rod has been detached and for locking the block from being moved in the slot.

5. In a cutting-tool of the character described, the combination of a body provided with an elongated slot T-shaped cross-sectionally, a cutter block shaped to fit in said slot to slide longitudinally therein and being square transversely whereby the cutter block may be mounted with either of its opposite sides engaging those of the slot, the cutter block having an integral upstanding cutting-blade arranged parallel with one of the sides of the block, and means for holding the cutter block slidably operative in the slot with its blade parallel with the sides thereof whereby to cut in a plane parallel with said sides and for locking the cutter block in a fixed position at various points in the length of the slot after the cutter block has been removed therefrom and replaced therein with its cutting-blade at right angles to the sides of the slot whereby to cut in a plane at right angles to that aforesaid.

AMOS W. LARSON.

Witnesses:
JOHN F. McCANNA,
DELLA ATKINSON.

Copies of this patent may be obtained for five cents each, by addressing the "Commissioner of Patents, Washington, D. C."